March 25, 1952  A. NIELSEN  2,590,201
TRACTOR HITCH
Filed June 22, 1948  2 SHEETS—SHEET 1
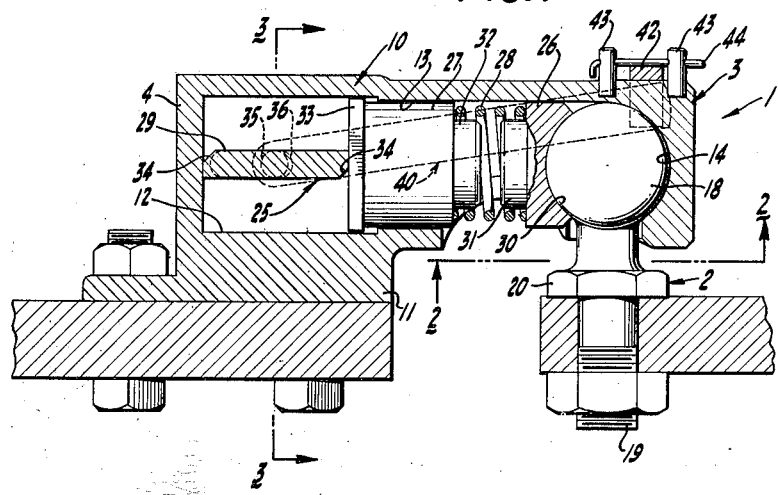
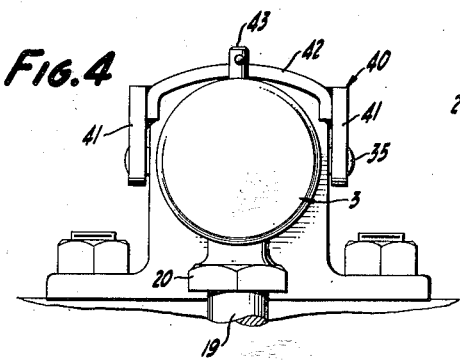
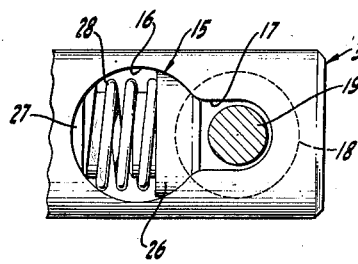
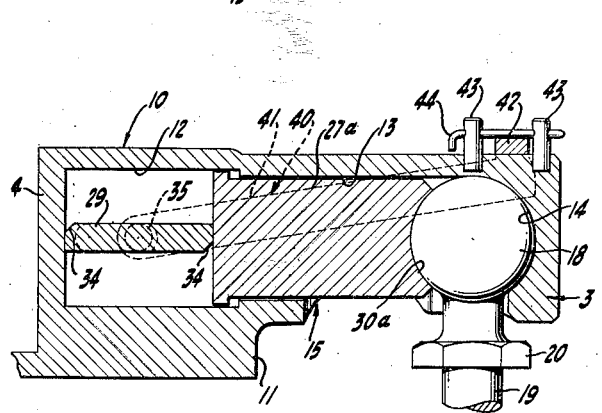
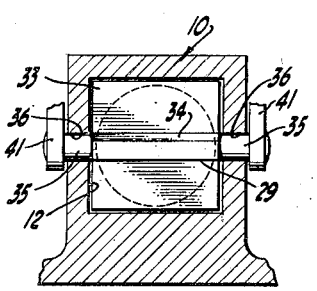
INVENTOR.
ADOLPH NIELSEN
BY
Mellin and Hanscom
ATTORNEYS March 25, 1952     A. NIELSEN     2,590,201
TRACTOR HITCH Filed June 22, 1948     2 SHEETS—SHEET 2

INVENTOR.
ADOLPH NIELSEN
BY
Mellin and Hanscom
ATTORNEYS

Patented Mar. 25, 1952

2,590,201

UNITED STATES PATENT OFFICE 2,590,201

TRACTOR HITCH

Adolph Nielsen, Oakland, Calif.

Application June 22, 1948, Serial No. 34,362

11 Claims. (Cl. 280—33.17)

This invention relates to a hitching or coupling device for coupling a trailer or the like to a passenger automobile or other automotive vehicle.

Coupling devices heretofore used for coupling trailers to passenger automobiles or the like involve bolting together cooperative members, with the result that threaded members are subject to loosening and disengagement by vibration, and they are also subject to rusting, thus becoming difficult to engage and disengage. Also, the design of prior coupling devices has been such as to put the greatest strain on a relatively weak member, such as a bolt or pin. Difficulties have also been encountered in aligning the coupling members of a trailer and an automotive vehicle during the coupling operation.

It is an object of the present invention to provide a hitching or coupling device adapted to couple a trailer to an automotive vehicle, which avoids the use of nuts and bolts or other similar locking devices which are subject to loosening by vibration, and to difficulty in engagement and disengagement because of rusting.

It is a further object of the invention to provide a hitching or coupling device for trailers which is easy to bring into alignment during the coupling operation.

It is a still further and particular object of the invention to provide a hitching or coupling device which is so designed that inadvertent uncoupling can occur only by a force sufficient to break a heavy casting or the like.

These and other objects of the invention will be apparent from the ensuing description and the appended claims.

Two forms which the invention may assume are exemplified in the following description and illustrated by way of example in the accompanying drawings, in which:

Fig. 1 is a longitudinal section through the device;

Fig. 2 is a bottom view of one end of the device along the line 2—2 of Fig. 1;

Fig. 3 is a transverse section taken along the line 3—3 of Fig. 1;

Fig. 4 is an end view as seen from the right of Fig. 1;

Fig. 5 is a longitudinal section of an alternative form of the device; and

Figure 6:
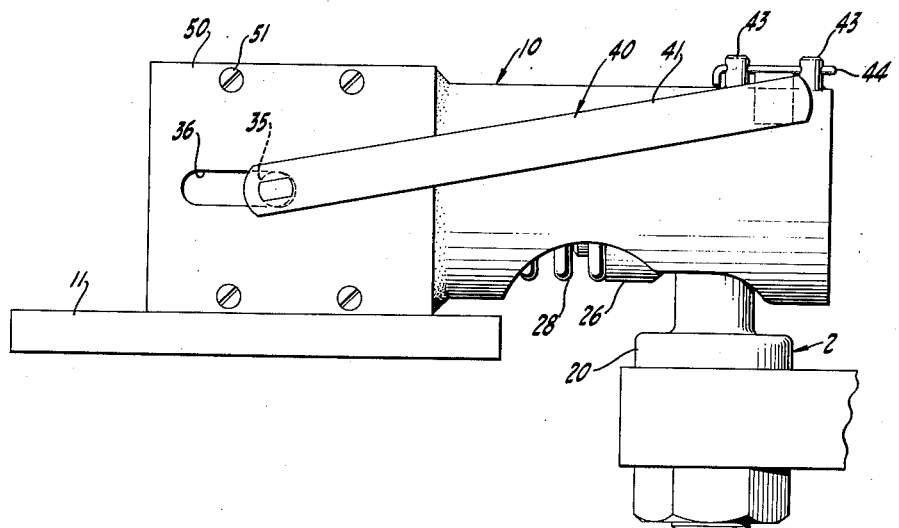
Fig. 6 is a side elevation of the device of either of the Figs. 1 and 5.

Referring now to the drawings, the hitching device 1 comprises a male member 2 and a socketed or female member 3. The socketed member 3 comprises a casting 10 having a base 11, which may be bolted to a trailer or an automotive vehicle, as shown. Usually, the socketed member 3 will be bolted to a trailer. The casting 10, as shown in Fig. 6, is provided with a removable side plate 50, bolted thereto by means of bolts 51, to permit access for purposes of assembly and adjustment. Formed in the casting 10, at the left end thereof as viewed in Fig. 1, is a chamber or cylinder 12 which is square or rectangular in transverse cross-section, and to the right thereof and running longitudinally of the casting is a cylindrical section 13 of circular cross-section terminating in a spherical socket 14. The under portion of the casting, to the right of the base 11, is cut away, as shown more clearly in Fig. 2, to provide a spoon-shaped opening 15 having an enlarged circular portion 16 and a narrowed neck portion 17.

The male member 2 is provided with a spherical head portion 18 complemental to the spherical end portion 14 formed in the casting, and with a shank 19 threaded at its lower end and having an annular collar 20. As shown, the male member 2 may be bolted to a trailer or automotive vehicle, being usually bolted to the latter.

It will be seen that the head portion 18 of the male member 2 can be readily inserted within the socket 14 of the casting 10 by first inserting the head portion through the circular opening 16, and then shifting one member or the other to engage the head portion with the socket 14. A ball and socket joint is thus provided.

To retain the members in coupled relation, there is provided a locking structure generally designated as 25 and disposed within the casting 10. The locking structure 25 comprises a locking member 26 of cylindrical cross-section, which is reciprocable within the cylinder 13 formed in the casting; a solid piston 27, which is also reciprocable with the cylinder 13; a coil spring 28 interposed between the locking member 26 and piston 27; and a cam plate 29. More particularly, the locking member 26 is hollowed out at one end to provide a socket 30 of the same spherical radius as the socket 14 formed in the casting 10, and it is provided with a stud or pin 31 at its other end to be received within the coil spring 28; and the piston 27 is provided at one end with a similar stud or pin 32 and, at its other end, with a square or rectangular head 33 complemental to and reciprocable within the chamber 12 formed in the casting 10.

The cam plate 29 is a flat, relatively thick plate of square or rectangular cross-section, having chamfered ends 34, preferably of a width slightly less than the width of this chamber 12 and of a length slightly less than the height of the chamber 12. It is provided with pivotal, floating support within the chamber 12 by means of pins 35 secured to and projecting from the mid-points of opposite edges, as shown, the pins 35 being received within and extending through slots 36 formed in the sides of the casting. The pivot pins 35 are secured to one end and opposite sides of a yoke 40 formed by two bars 41. A handle is provided at the other end of the yoke by a strap or bar 42, and a latch or locking element is provided by pierced studs or pins 43 secured to and projecting upwardly from the casting on opposite sides of the handle 42, and a pin 44 adapted to extend through the pins and bear against the handle, as shown.

Referring now to Fig. 5, the coupling device there shown is identical with that described above and shown in Figs. 1 to 4, except that the piston 27a extends all the way through to the socket 14, having an appropriate socketed end 30a.

In the structures of Figs. 1 to 6, the yoke 40 is secured to the cam plate 29 at an angle, as shown, such that when the handle 42 abuts the casting 10, the cam plate 29 will be horizontal, with its pivotal axis intersecting and at right angles to the longitudinal axis of the piston 27 or 27a.

In coupling the structure thus described, the locking pin 44 is removed and the yoke 40 is pivoted upwardly to rotate the cam plate 29 counter-clockwise to vertical or approximately vertical position. In the structures shown in Figs. 1 to 4, the coil springs 28 will automatically shift the piston 27 to the left, inwardly of the chamber 12. The locking member 26 is then pushed to the left so as to clear the circular opening 16 in the bottom of the casting. The spherical head 18 of the male member 2 is then socketed in the socket 14 as described above, and the yoke 40 is then pushed downwardly until the handle 42 engages the top portion of the casting. The locking pin 44 is then inserted through the pins 43. In uncoupling the device, it is merely necessary to withdraw the locking pin 44, raise the yoke to approximately vertical position, shift the locking member 26 to clear the circular opening 16, and slide the trailer forwardly to align the spherical head 18 of the male member with the circular opening 16.

It will thus be seen that there has been provided a hitching or coupling device which is easily coupled and uncoupled, which does not involve the use of nuts and bolts which are likely to become rusted or to shake loose and cause accidental uncoupling. It will also be seen that a coupling device of great strength is provided. Thus, when the handle 42 is pinned down and the cam plate 29 is in horizontal position with its flat ends wedged between and bearing against the head 33 of the piston 27 and the rear wall 4 of the casting 10, no torque is exerted on the cam tending to pivot it to uncoupling position. Forces exerted on the cam plate 29 are not transmitted to relatively weak members, such as the pins 35, but are exerted on the cam itself, the rear wall 4 of the casting 10 and the piston 27. Breakage of heavy parts such as these is required for accidental uncoupling to occur. An additional advantage resides in the fact that, by the floating support of the cam plate 29 within the chamber 12, a minimum of space is required for its pivotal movement.

While I have shown the preferred form of my invention it is to be understood that various changes may be made in its construction by those skilled in the art without departing from the spirit of the invention as defined in the appended claims.

Having thus described my invention, what I claim and desire to secure by Letters Patent is—

1. A coupling device comprising, a body having a chamber and a generally keyhole-shaped aperture opening into the chamber to allow a headed member to pass into the chamber through the larger portion of the aperture and then being moved forwardly in the chamber with the shank of the headed member being received by the narrow portion of the aperture, means for retaining a headed member in the forward end of the chamber comprising a head-engaging member, a pivotal cam mounted for bodily movement forwardly toward and rearwardly away from the head-engaging member and pivotal to a camming position where the cam engages the head-engaging member and to a releasing position, and means for preventing rearward bodily movement of the cam when the cam is in camming position.

2. A coupling device comprising, a body having a chamber and a generally keyhole-shaped aperture opening into the chamber to allow a headed member to pass into the chamber through the larger portion of the aperture and then being moved forwardly in the chamber with the shank of the headed member being received by the narrow portion of the aperture, means for retaining a headed member in the forward end of the chamber comprising a head-engaging member, a pivotal cam mounted for bodily movement forwardly toward and rearwardly away from the head-engaging member and pivotal to a camming position where the cam engages the head-engaging member and to a releasing position, and means for preventing rearward bodily movement of the cam when the cam is in camming position, the length of the narrow portion of the aperture being greater than the distance from the camming face of the cam to its pivotal axis.

3. A coupling device comprising, a body having a chamber and a generally keyhole-shaped aperture opening into the chamber adjacent one end thereof with the narrow portion of the aperture being directed toward said one end whereby a headed member can be passed into the chamber through the larger portion of the aperture and be moved forwardly toward said one end of the chamber with the shank of the headed member being received by the narrow portion of the aperture, means for retaining the headed member in the forward end of the chamber comprising a head-engaging member, a pivotal cam engageable on opposite sides with the head-engaging member and that portion of the interior of the body defining the rearward end of the chamber when in camming position and pivotal to a releasing position and being bodily movable rearwardly with respect to the body.

4. A coupling device comprising, a body having a chamber and a generally keyhole-shaped aperture opening into the chamber adjacent one end thereof with the narrow portion of the aperture being directed toward said one end whereby a headed member can be passed into the chamber through the larger portion of the aperture and be moved forwardly toward said one end of the chamber with the shank of the headed member being received by the narrow portion of the aperture, means for retaining the headed member in the forward end of the chamber comprising a head-engaging member, the interior of the body having a flat portion defining at least a part of the rearward end of the chamber, a pivotal cam mounted for bodily movement toward and away from the head-engaging member and said flat portion of the body and having two spaced, oppositely disposed flat camming faces engageable with the head-engaging member and said flat portion of the body respectively when the cam is moved to camming position, and means for pivoting the cam to camming position and therefrom to a releasing position whereby when the cam is pivoted to releasing position it can be bodily moved toward said flat portion of the body to permit a headed member in the chamber to be moved forwardly and withdrawn through the larger portion of the aperture.

5. A coupling device comprising, a body having a chamber and an opening to enable a headed member to be passed into the chamber, means for clamping a headed member in the chamber comprising a head-engaging member adapted to engage a headed member, and a pivotal cam in the chamber having two spaced oppositely disposed camming faces engageable with the head-engaging member and the interior of the body respectively when the cam is pivoted to camming position.

6. A coupling device comprising, a body having a chamber and an opening to enable a headed member to be passed into the chamber, means for clamping a headed member in the chamber comprising a head-engaging member adapted to engage a headed member, a movable cam movable to a camming and a releasing position having two oppositely disposed camming faces and engaging the head-engaging member with one of its faces when moved to its camming position, means for moving the cam to its camming position, and means engageable with the other face of the cam when the cam is moved to its camming position whereby the load imposed on the cam is transmitted directly through the cam to said last-named means.

7. A coupling device comprising, a body having a chamber and an opening to enable a headed member to be passed into the chamber, means for clamping a headed member in the chamber comprising a head-engaging member adapted to engage a headed member, a cam in the chamber having laterally extending pivots received in slots in the body enabling both pivotal and bodily movement of the cam, means for pivoting the cam to camming position where the cam engages the head-engaging member, and means engaging the cam on the opposite side thereof from the side in engagement with the head-engaging member to prevent bodily movement of the cam when in camming position.

8. A coupling device comprising, a body having a chamber and an opening to enable a headed member to be passed into the chamber, means for clamping a headed member in the chamber comprising a head-engaging member adapted to engage a headed member, a cam in the chamber having laterally extending pivots received in slots in the body enabling both pivotal and bodily movement of the cam, and having two spaced oppositely disposed camming faces engaging the head-engaging member and the interior of the body respectively when pivoted to camming position, and means for pivoting the cam to camming position.

9. A coupling device comprising, a body having a chamber and an opening to enable a headed member to be passed into the chamber, means for clamping a headed member in the chamber comprising a head-engaging member adapted to engage a headed member, a cam in the chamber, means mounting the cam for pivotal movement toward and away from a camming position and for bodily movement with respect to the body and with respect to that portion of the interior of the body defining the rearward end of the chamber, said cam having spaced oppositely disposed flat camming faces engaging the head-engaging member and said portion of the interior of the body respectively when moved to camming position whereby load imposed on the cam is transmitted directly therethrough to the body and not imposed on the mounting means for the cam.

10. A coupling device comprising, a body having a chamber and a generally keyhole-shaped aperture opening into the chamber to allow a headed member to pass into the chamber through the larger portion of the aperture and then be moved rearwardly in the chamber with the shank of the headed member being received by the narrow portion of the aperture, means for retaining a headed member in the forward end of the chamber comprising a head-engaging member, a pivotal cam having spaced oppositely disposed camming faces and engaging with one of its faces the head-engaging member when moved to camming position, means for moving the cam to its camming position, and means engageable with the other face of the cam when the cam is moved to its camming position whereby load imposed on the cam is transmitted directly through the cam to said last-named means.

11. A coupling device comprising, a body having a chamber and a generally keyhole-shaped aperture opening into the chamber to allow a headed member to pass into the chamber through the larger portion of the aperture and then be moved rearwardly in the chamber with the shank of the headed member being received by the narrow portion of the aperture, means for retaining a headed member in the forward end of the chamber comprising a head-engaging member, a pivotal cam having oppositely disposed flat camming faces equally spaced from the pivotal axis of the cam and engaging with one of its faces the head-engaging member when moved to camming position, means for moving the cam to its camming position, and means engageable with the other face of the cam when the cam is moved to its camming position whereby load imposed on the cam is transmitted directly through the cam to said last-named means.

ADOLPH NIELSEN.

REFERENCES CITED

The following references are of record in the file of this patent:

UNITED STATES PATENTS

| Number | Name | Date |
| --- | --- | --- |
| 1,281,049 | Menhall et al. | Oct. 8, 1918 |
| 1,340,521 | Cadman | May 18, 1920 |
| 2,166,738 | Bradley | July 18, 1939 |
| 2,217,234 | Rasmussen | Oct. 8, 1940 |

FOREIGN PATENTS

| Number | Country | Date |
| --- | --- | --- |
| 649,571 | Germany | Aug. 27, 1937 |
| 659,056 | Germany | Apr. 23, 1938 |
| 688,792 | France | Aug. 28, 1930 |
| 816,286 | France | Aug. 4, 1937 |